(12) United States Patent
Mano

(10) Patent No.: US 9,047,028 B2
(45) Date of Patent: Jun. 2, 2015

(54) APPARATUS AND METHOD FOR ASSIGNING PRINT JOB

(75) Inventor: Jun Mano, Amagasaki (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 185 days.

(21) Appl. No.: 13/609,379

(22) Filed: Sep. 11, 2012

(65) Prior Publication Data

US 2013/0063779 A1 Mar. 14, 2013

(30) Foreign Application Priority Data

Sep. 12, 2011 (JP) ................................. 2011-198336

(51) Int. Cl.
*G06F 3/12* (2006.01)
*G06K 15/00* (2006.01)

(52) U.S. Cl.
CPC ........... *G06F 3/1221* (2013.01); *Y02B 60/1271* (2013.01); *G06F 3/126* (2013.01); *G06F 3/1288* (2013.01)

(58) Field of Classification Search
USPC ....................................................... 358/1.15
See application file for complete search history.

(56) References Cited

U.S. PATENT DOCUMENTS

| 7,447,730 | B2 | 11/2008 | Iguchi et al. | |
|---|---|---|---|---|
| 2003/0111218 | A1 | 6/2003 | Iguchi et al. | |
| 2005/0269071 | A1* | 12/2005 | Simmet et al. | ................. 165/202 |
| 2007/0024655 | A1* | 2/2007 | Masashi | ........................... 347/14 |
| 2007/0273723 | A1* | 11/2007 | Tsuchikawa | .................... 347/17 |
| 2011/0116128 | A1 | 5/2011 | Tamada | |

FOREIGN PATENT DOCUMENTS

| CN | 201344605 Y | 11/2009 |
|---|---|---|
| JP | 2003-186373 A | 7/2003 |
| JP | 2004-272011 A | 9/2004 |
| JP | 2007-180906 A | 7/2007 |

OTHER PUBLICATIONS

First Office Action issued Sep. 2, 2014, in corresponding Chinese Patent Application No. 201210332392.2, and English translation thereof.

* cited by examiner

*Primary Examiner* — Dov Popovici
(74) *Attorney, Agent, or Firm* — Buchanan Ingersoll & Rooney PC

(57) ABSTRACT

An apparatus for assigning a print job is provided. The apparatus includes a detector configured to detect an ambient temperature of each of a plurality of areas, each of the areas including at least one printer and at least one air conditioning system; a selection portion configured to select a printer included in a suitable area of the areas, the suitable area being an area where the ambient temperature detected is lower than a predetermined temperature; and an issuing portion configured to give the print job to the printer selected.

29 Claims, 15 Drawing Sheets

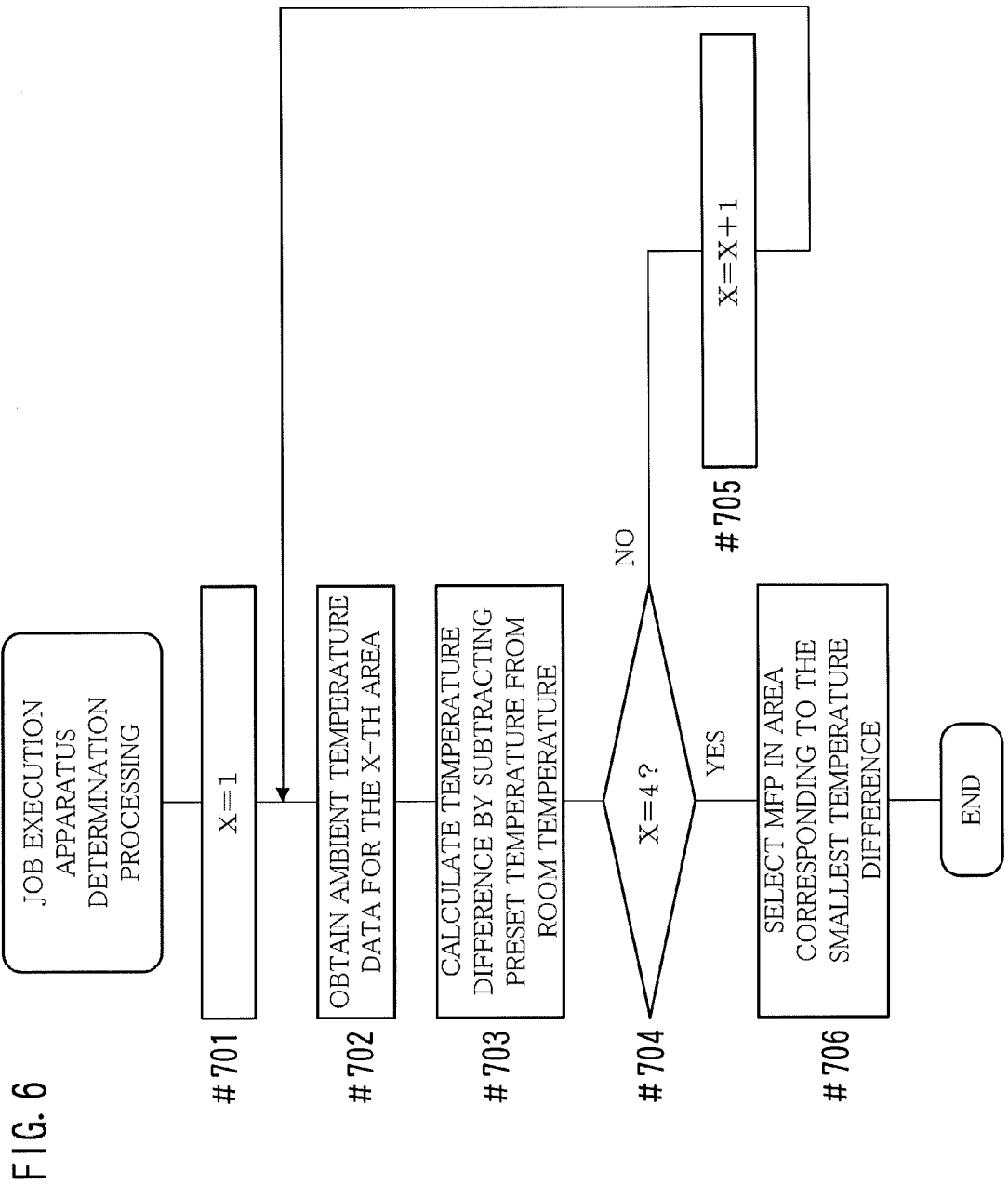

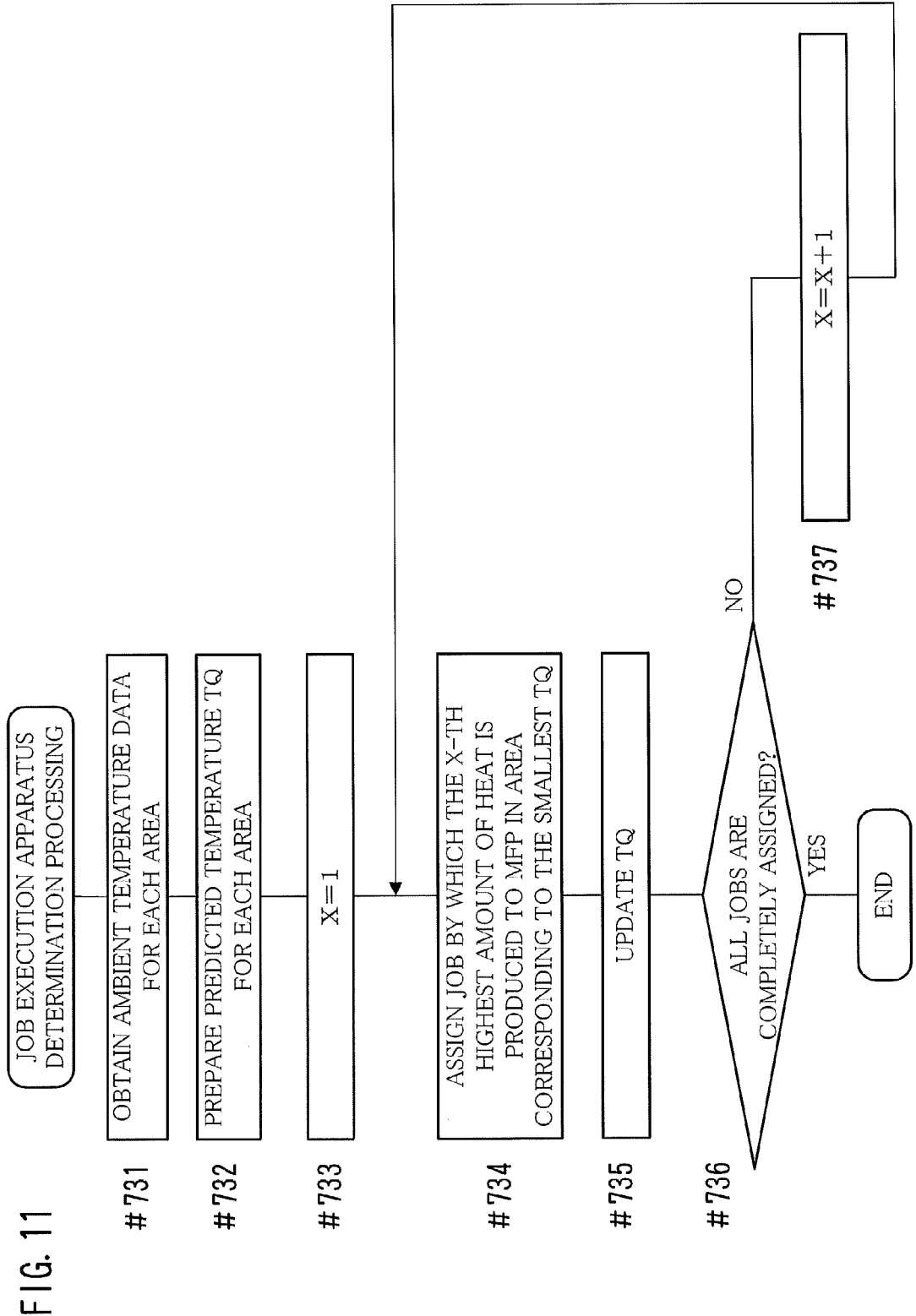

APPARATUS AND METHOD FOR ASSIGNING PRINT JOB

This application is based on Japanese patent application No. 2011-198336 filed on Sep. 12, 2011, the contents of which are hereby incorporated by reference.

BACKGROUND OF THE INVENTION

1. Field of the Invention

The present invention relates to a technology for assigning a job to any one of apparatuses.

2. Description of the Related Art

In recent years, many different techniques for energy saving have been proposed. An example of methods for energy saving is to reduce power required to control the temperature of a room in an office, and so on.

The temperature of a room is often adjusted by using an air conditioner. Thus, appropriate control of air conditioners can save energy.

In the meantime, Office Automation (OA) equipment such as an image forming apparatus and a personal computer has recently been installed in business offices. Techniques for energy saving are also applied to such OA equipment. For example, according to a sleep mode technique, if no operation has been carried out in OA equipment for a preset time period, a hard disk and a display of the OA equipment stops operating temporarily, which reduces power consumption of the OA equipment.

There is proposed a method for controlling the temperature of a room where both an image forming apparatus and air-conditioning equipment (air conditioner) are installed. An example of the method is given below.

A home server controls an image forming apparatus and an air conditioner collectively. The image forming apparatus reads a print job quantity and transmits it to the air conditioner. The air conditioner cools and warms a room in response to the print job quantity. The air conditioner detects a temperature and humidity in the room and transmits the detected result to the image forming apparatus. The image forming apparatus controls a drive fan, a condensation preventing heater, and a dehumidification heater in the apparatus and adjusts a temperature and humidity in the apparatus based on the temperature and the humidity in the room (see the English abstract of Japanese Laid-open Patent Publication No. 2003-186373).

According to the method, it is necessary for the home server to manage the air conditioner. In recent years, there have been proposed electrical appliances having a function to perform communication with another device via a network, i.e., intelligent home appliances. However, the widespread use of such intelligent home appliances is yet to come. At present, the vast majority of electrical appliances have no communication function. In view of this, it probably takes a little time before the foregoing method is widely used.

On the other hand, almost all of image forming apparatuses have recently been equipped with a communication function. Further, some techniques for controlling an image forming apparatus by using a server become widespread.

SUMMARY

The present disclosure is directed to solve the problems pointed out above, and therefore, an object of an embodiment of the present invention is to achieve energy conservation in offices and so on without direct control of an air-conditioning system such as an air conditioner.

In one aspect of the present invention, an apparatus for assigning a print job includes a detector configured to detect an ambient temperature of each of a plurality of areas, said each of the areas including at least one printer and at least one air conditioning system; a selection portion configured to select a printer included in a suitable area of the areas, the suitable area being an area where the ambient temperature detected is lower than a predetermined temperature; and an issuing portion configured to give a print job to the printer selected.

Preferably, the selection portion may select a printer included in an area, of the areas, where the ambient temperature detected is lowest with reference to a predetermined temperature.

In another aspect of the present invention, an apparatus for assigning a print job includes a detector configured to detect an ambient temperature of each of a plurality of areas, said each of the areas including at least one printer and at least one air conditioning system; an estimating portion configured to estimate an ambient temperature of each of the areas for a case where a printer included in said each of the areas finishes executing a print job, the ambient temperature being estimated based on the ambient temperature detected and characteristics of the printer; a selection portion configured to select a printer included in a suitable area of the areas, the suitable area being an area where the ambient temperature estimated is lower than a predetermined temperature; and an issuing portion configured to give a print job to the printer selected.

Preferably, the selection portion may select a printer included in an area, of the areas, where the ambient temperature detected is lowest with reference to a predetermined temperature.

In yet another aspect of the present invention, an apparatus for assigning, in order, P print jobs wherein P represents 2 or more includes a detector configured to detect an ambient temperature of each of a plurality of areas, said each of the areas including at least one printer and at least one air conditioning system; an estimating portion configured to estimate, when a Q-th print job out of the P print jobs is assigned wherein Q represents a number in a range from 1 to P inclusive, an ambient temperature of each of the areas for a case where a printer included in said each of the areas finishes executing a print job earlier than a (Q−1)-th print job assigned to the printer and the printer finishes executing the Q-th print job, the ambient temperature being estimated based on the ambient temperature detected and characteristics of the printer; a selection portion configured to select, as a target printer to which the Q-th print job is assigned, a printer included in an area, of the areas, where the ambient temperature estimated is the lowest; and an issuing portion configured to give the Q-th print job to the printer selected.

These and other characteristics and objects of the present invention will become more apparent by the following descriptions of preferred embodiments with reference to drawings.

BRIEF DESCRIPTION OF THE DRAWINGS

FIG. 6 is a flowchart depicting an example of the flow of job execution apparatus determination processing.

FIG. 11 is a flowchart depicting a modification of the flow of job execution apparatus determination processing.

DESCRIPTION OF THE PREFERRED EMBODIMENTS

Figure 1:
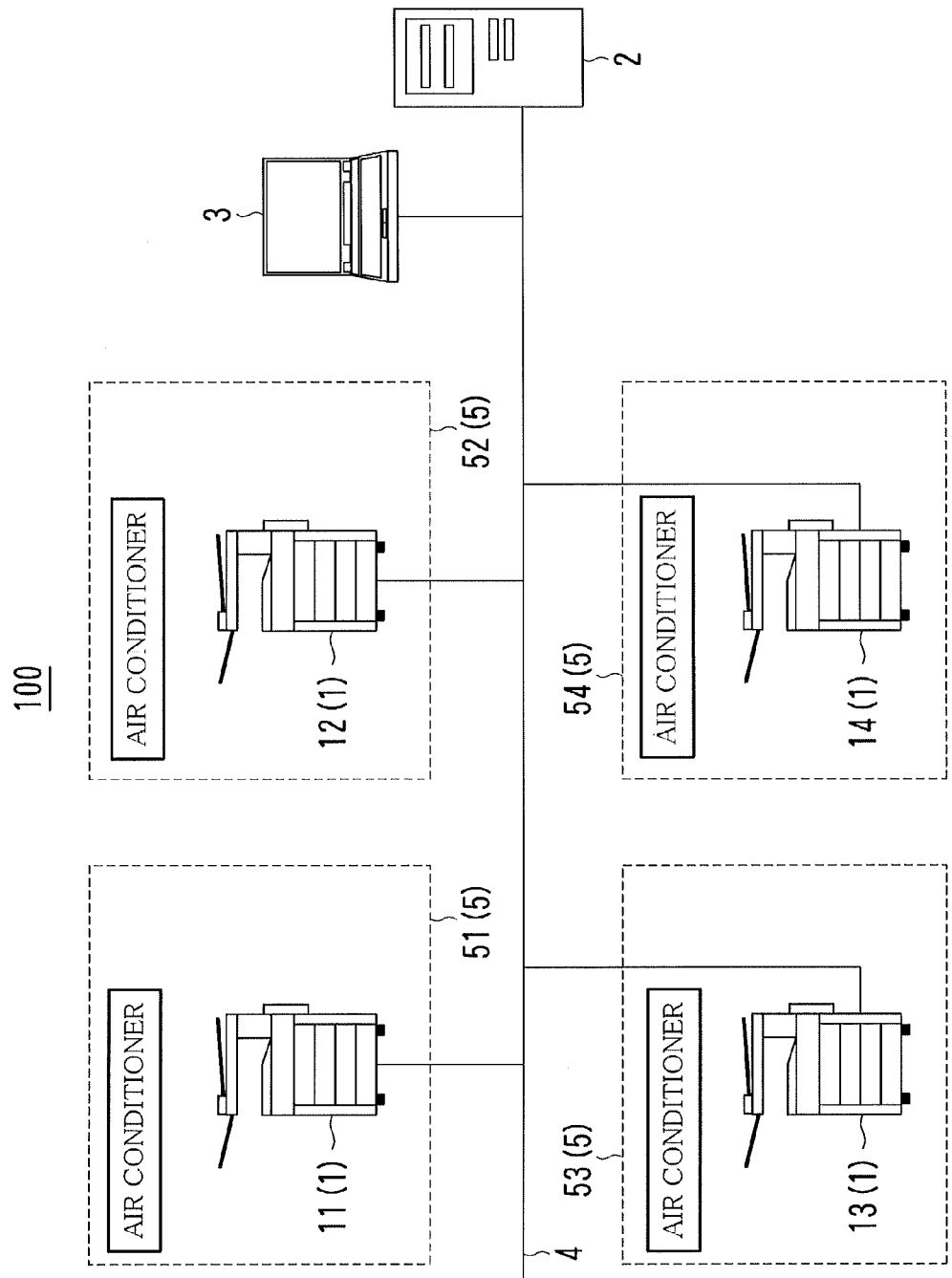
FIG. 1 is a diagram showing an example of the overall configuration of a printing system.
Figure 2:
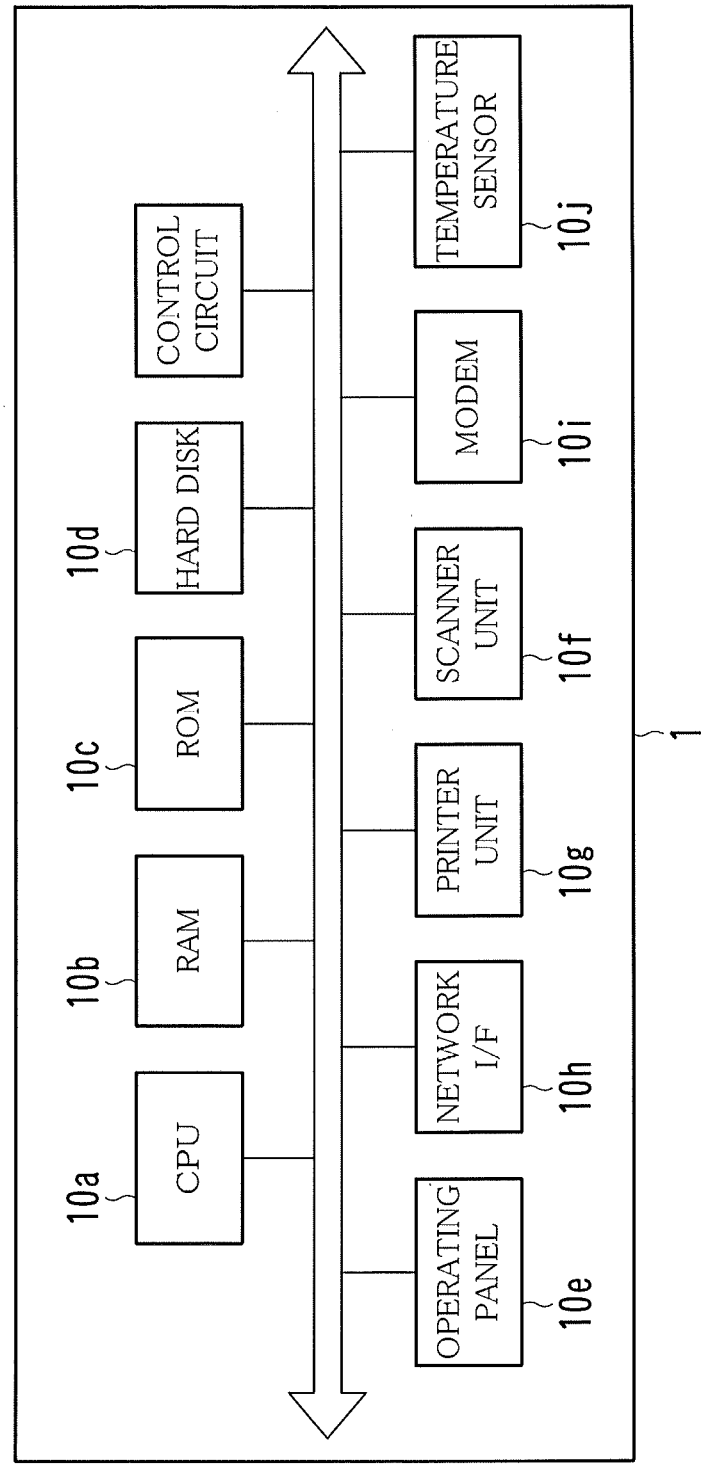
FIG. 2 is a diagram showing an example of the hardware configuration of an image forming apparatus.
Figure 3:
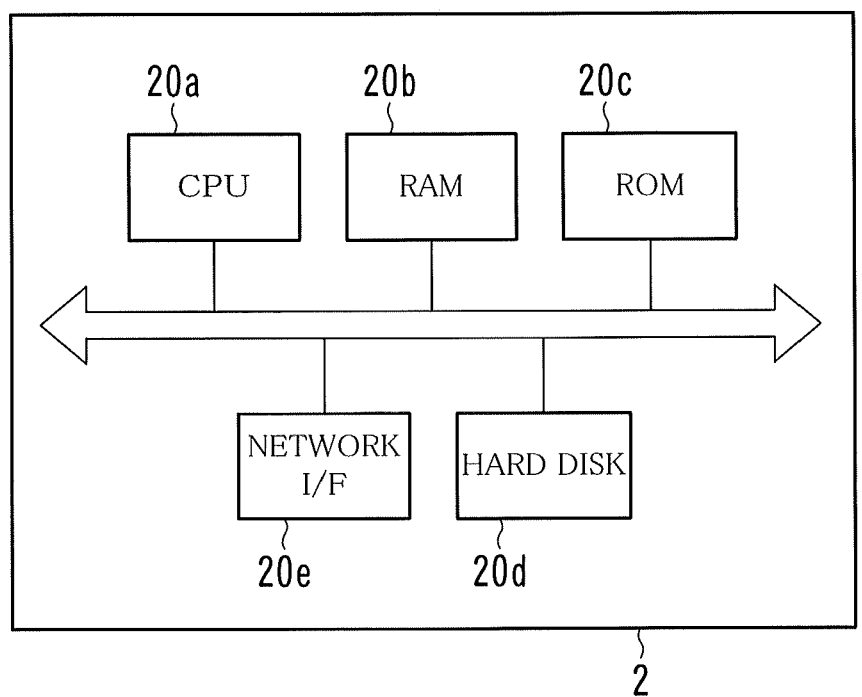
FIG. 3 is a diagram showing an example of the hardware configuration of a print server.
Figure 4:
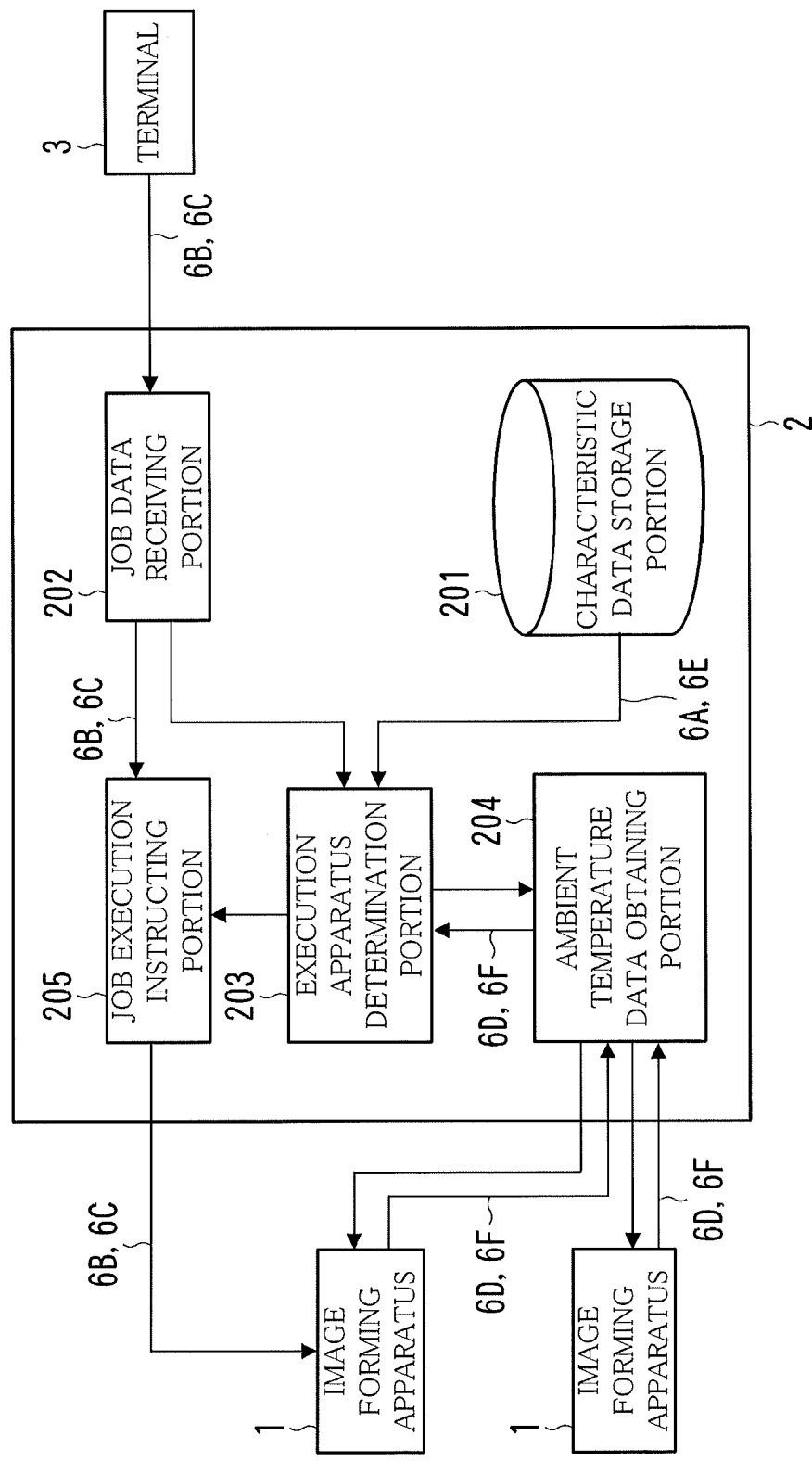
FIG. 4 is a diagram showing an example of the functional configuration of a print server.

FIG. 1 is a diagram showing an example of the overall configuration of a printing system 100; FIG. 2 is a diagram showing an example of the hardware configuration of an image forming apparatus 1; FIG. 3 is a diagram showing an example of the hardware configuration of a print server 2; and FIG. 4 is a diagram showing an example of the functional configuration of the print server 2.

Referring to FIG. 1, the printing system 100 is configured of a plurality of image forming apparatuses 1, the print server 2, at least one terminal 3, a communication line 4, and so on.

The printing system 100 is a system to print an image onto paper. The printing system 100 is installed in a facility of an organization such as a corporation and a public office, and therefore, is used by members of the organization. In short, the members of the organization are users of the printing system 100.

A facility space (a certain floor, for example) of the organization is divided into a plurality of areas (regions) 5. Each of the areas 5 has one air conditioner installed therein. One area 5 has a size which allows an air conditioner installed therein to control an ambient temperature of the area 5. Two areas 5 adjacent to each other may or may not be partitioned. Each of the areas 5 has one image forming apparatus 1 installed therein.

The following description provides an example in which a facility space is divided into four areas. The areas 5 may be described separately as an "area 51", "area 52", "area 53", and "area 54". Further, the image forming apparatuses 1 installed in the areas 51, 52, 53, and 54 are referred to as an "image forming apparatus 11", "image forming apparatus 12", "image forming apparatus 13", and "image forming apparatus 14", respectively.

Each of the areas 5 is given one unique area identifier EC. Likewise, each of the image forming apparatuses 1 is given one unique device identifier DC. The area identifier EC of a certain area 5 and the device identifier DC of the image forming apparatus 1 installed in the area 5 are associated with each other and registered in the print server 2. The device identifier DC may be a network address such as an Internet Protocol (IP) address or a Media Access Control (MAC) address.

The image forming apparatuses 1, the print server 2, and the terminals 3 are capable of conducting communication with one another via the communication line 4. Examples of the communication line 4 are a Local Area Network (LAN), the Internet, a dedicated line, and a public line.

The image forming apparatus 1 is a processing apparatus in which various functions such as copying, scanning, faxing, and network printing are consolidated. The image forming apparatus 1 is sometimes called a "multifunction device" or a "Multi-Functional Peripheral (MFP)".

The "network printing" is a function to receive image data from a terminal such as a personal computer and to print an image onto paper. The network printing function is sometimes called a "network printer function" or "PC printing function". In the printing system 100, however, image data is sent from the terminal 3 through the print server 2 to the image forming apparatus 1 instead of being sent directly from the terminal 3 to the image forming apparatus 1. The detailed description is provided later.

As shown in FIG. 2, the image forming apparatus 1 is configured of a Central Processing Unit (CPU) 10a, a Random Access Memory (RAM) 10b, a Read Only Memory (ROM) 10c, a hard disk 10d, an operating panel 10e, a scanner unit 10f, a printer unit 10g, a network interface 10h, a modem 10i, a temperature sensor 10j, a variety of control circuits, and so on.

The network interface 10h performs communication with the print server 2 and the terminal 3 in accordance with a protocol such as Transmission Control Protocol/Internet Protocol (TCP/IP). An example of the network interface 10h is a Network Interface Card (NIC).

The modem 10i is a device to send and receive image data, based on a protocol such as G3, with other fax terminals.

The scanner unit 10f serves to optically read out an image such as characters, symbols, photographs, charts, illustrations, and the like that are recorded on a sheet of paper, and to generate image data thereof.

The printer unit 10g prints, onto paper, an image read out by the scanner unit 10f and an image indicated in data sent by the print server 2, the terminal 3, or a fax terminal.

The operating panel 10e is configured of a touch-sensitive panel display, a numerical keypad, and so on. The touch-sensitive panel display displays, for example, a screen for presenting messages or instructions to a user, a screen for allowing a user to input processing types and conditions desired by him/her, and a screen showing the results of processing performed by the CPU 10a. A user operates the touch-sensitive panel display or the numerical keypad while looking at these screens to enter information and commands to the image forming apparatus 1.

The temperature sensor 10j serves to measure an ambient temperature of an area where the image forming apparatus 1 including the temperature sensor 10j itself is installed.

The ROM 10c or the hard disk 10d has operating system, middleware, and so on installed therein, as software for implementing the functions discussed above. The ROM 10c or the hard disk 10d also has installed therein an ambient temperature replying application for informing the print server 2 of an ambient temperature measured by the temperature sensor 10j in response to an inquiry from the print server 2. These pieces of software are loaded into the RAM 10b as needed and executed by the CPU 10a.

The print server 2 provides a service of assigning print jobs sent from the terminal 3 to any of the image forming apparatuses 1. Referring to FIG. 3, the print server 2 is configured of a CPU 20a, a RAM 20b, a ROM 20c, a hard disk 20d, a network interface 20e, and so on.

The network interface 20e is an NIC performing communication with the image forming apparatus 1 and the terminal 3 in accordance with a protocol such as TCP/IP.

The ROM 20c or the hard disk 20d has installed therein operating system, middleware, and an application for assigning print jobs. Thanks to the application, the functions of a characteristic data storage portion 201, a job data receiving portion 202, an execution apparatus determination portion 203, an ambient temperature data obtaining portion 204, a job execution instructing portion 205, and so on all of which are shown in FIG. 4 are implemented.

These pieces of software are loaded into the RAM 20b as needed and executed by the CPU 20a. The processing described later with reference to FIGS. 6, 9, 10, and 11 is also implemented by operation and control by the CPU 20a.

The terminal 3 is a client for a user to use a printing service provided by the image forming apparatus 1. The terminal 3 may be a personal computer, a Personal Digital Assistant (PDA), or a smartphone, for example. The terminal 3 has installed therein a printer driver for the image forming apparatus 1.

The terminal 3 may be installed in any one of the areas 5 or at a site other than the areas 5.

Figure 5:
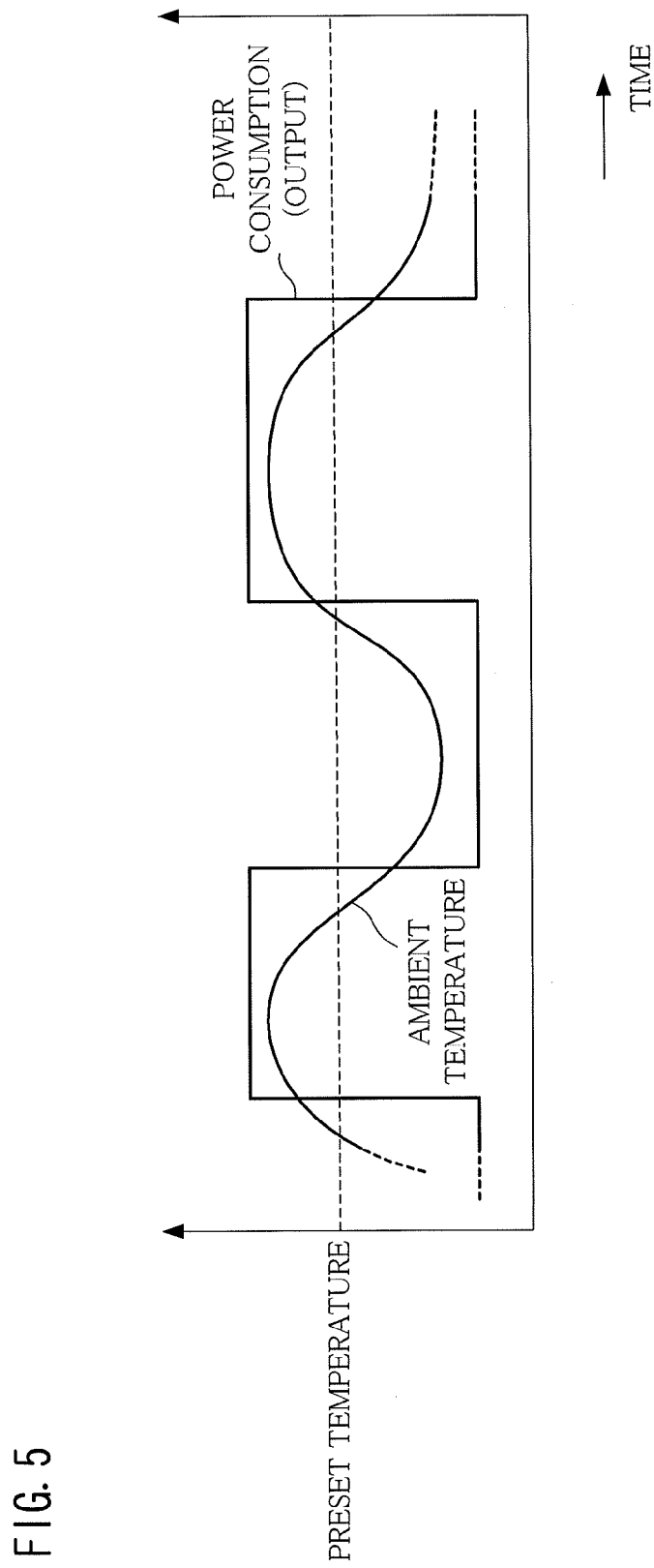
FIG. 5 is a graph showing an example of general change in ambient temperature and in output of an air conditioner.
Figure 7A:
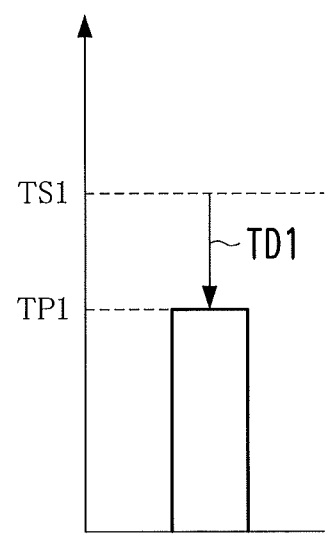
FIGS. 7A-7D are diagrams showing an example of a preset temperature, an ambient temperature, and a temperature difference in each area.
Figure 7B:
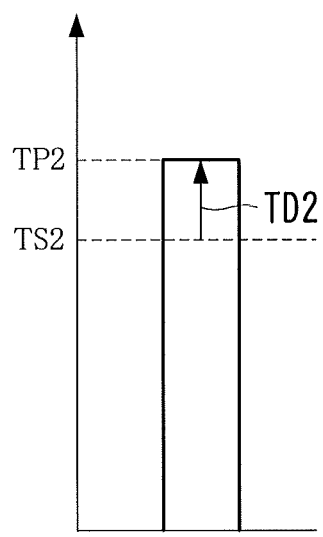
Figure 7C:
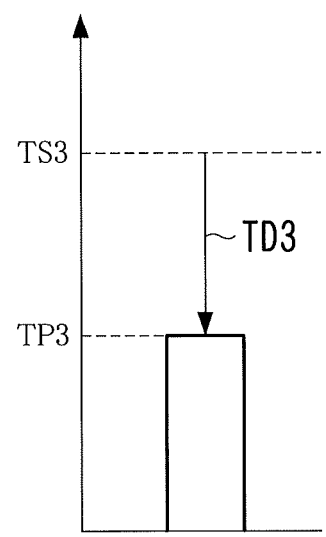
Figure 7D:
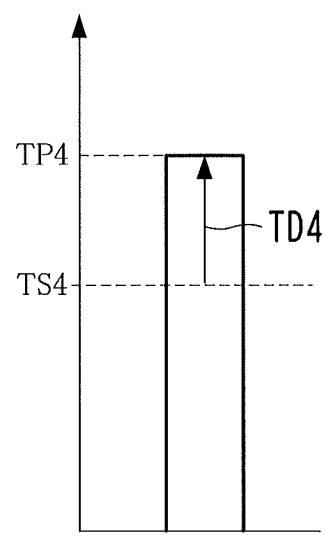
Figure 8A:
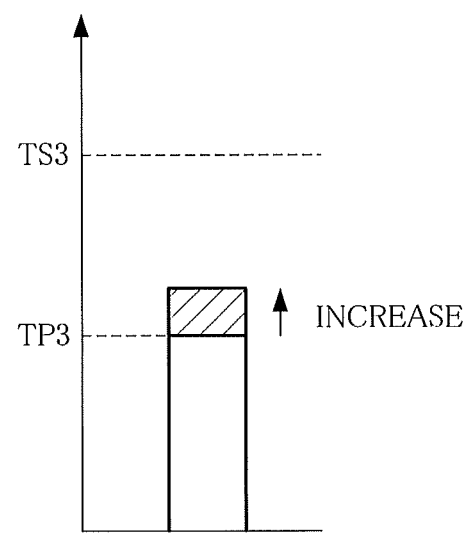
FIGS. 8A and 8E are diagrams showing an example of an estimated rise in ambient temperature if a print job is executed in each area.
Figure 8B:
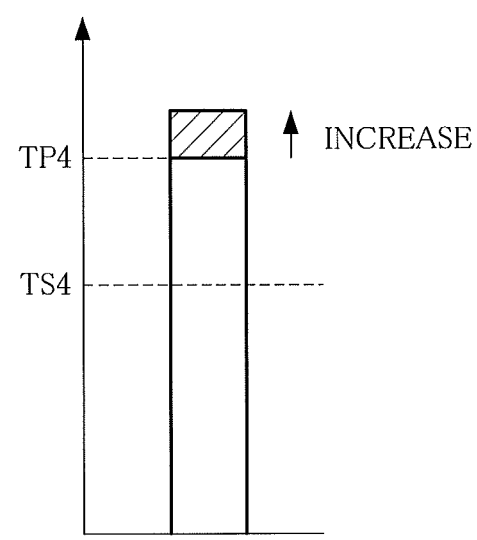

FIG. 5 is a graph showing an example of general change in ambient temperature and in output of an air conditioner; FIG. 6 is a flowchart depicting an example of the flow of job execution apparatus determination processing; FIGS. 7A-7D are diagrams showing an example of a preset temperature TS, an ambient temperature TP, and a temperature difference TD in each of the areas 51-54; and FIGS. 8A and 8B are diagrams showing an example of an estimated rise in ambient temperature if a print job is executed in each of the areas 53 and 54.

Descriptions are provided below, with reference to FIG. 6 and so on, of the processing performed by the image forming apparatus 1, the print server 2, and the terminal 3 in order to assign print jobs.

The characteristic data storage portion 201 of the print server 2 stores, therein, characteristic data 6A for each of the areas 5. The characteristic data 6A shows various characteristics of the corresponding area 5. In particular, according to this embodiment, the characteristic data 6A shows a preset temperature TS of an air conditioner installed in the corresponding area 5, and an area identifier EC for identifying the area 5. For example, characteristic data 6A for the area 51 shows a preset temperature TS of an air conditioner installed in the area 51. These sets of characteristic data 6A are stored in advance in the characteristic data storage portion 201.

In general, an air conditioner operates in such a manner that the surrounding temperature becomes equal to a preset temperature. As shown in FIG. 5, the air conditioner for cooling performs high-power operation while the surrounding temperature is higher than the preset temperature. On the other hand, the air conditioner for cooling stops or performs low-power operation while the surrounding temperature is lower than the preset temperature.

A user prepares, in the terminal 3, image data on an image to be printed. The image data can be prepared by using an application such as word processing software or rendering software to create an image. Alternatively, web page data may be downloaded from a web site on the Internet, and the web page data may be used as the image data.

The user specifies print job conditions such as the set of prints, and then enters a print command into the terminal 3.

In response to the operation, the terminal 3 creates print data 6B, for example, by causing the driver to convert the image data into data for Page Description Language (PDL). The terminal 3 then sends, to the print server 2, the print data 6B together with conditions data 6C indicating the print job conditions specified by the user.

With the print server 2, the job data receiving portion 202 receives the print data 6B and the conditions data 6C from the terminal 3.

When the print data 6B and the conditions data 6C are received, the execution apparatus determination portion 203 determines an image forming apparatus 1 suitable for executing a print job based on the print data 6B and the conditions data 6C. At this time, the ambient temperature data obtaining portion 204 performs processing for obtaining, from the individual image forming apparatuses 1, ambient temperature data for the individual areas 5.

Descriptions are provided below of the details of processing performed by the execution apparatus determination portion 203 and the ambient temperature data obtaining portion 204, with reference to the flowchart of FIG. 6.

When the print data 6B and the conditions data 6C are received, the execution apparatus determination portion 203 instructs the ambient temperature data obtaining portion 204 to obtain ambient temperature data. In accordance with the instructions, the ambient temperature data obtaining portion 204 requests data on current ambient temperature from the image forming apparatus 11 installed in the area 51 that is the first area 5, and obtains the data therefrom (Step #702).

At this time, in the image forming apparatus 11, the following processing is carried out based on the ambient temperature replying application. The temperature sensor 10j measures the current ambient temperature TP. The CPU 10a creates ambient temperature data 6D indicating the ambient temperature TP obtained by the measurement and an area identifier EC of the area 51. Then, the ambient temperature data 6D is sent to the print server 2 through the network interface 10h.

The execution apparatus determination portion 203 calculates a temperature difference TD by subtracting the preset temperature TS indicated in the characteristic data 6A on the area 51 from the ambient temperature TP indicated in the ambient temperature data 6D sent from the image forming apparatus 11 (Step #703).

Likewise, as for the second through fourth areas 5, the execution apparatus determination portion 203 and the ambient temperature data obtaining portion 204 receive ambient temperature data 6D from each of the image forming apparatus 12-14, and calculates the individual temperature differences TD by subtracting the individual preset temperatures TS from the individual ambient temperatures TP (Steps #702-#705).

The execution apparatus determination portion 203 then extracts, from the temperature differences TD for the areas 51-54, one having the smallest value, and determines that the image forming apparatus 1 installed in one of the areas 5 corresponding to the extracted temperature difference TD is an image forming apparatus 1 suitable for executing the print job (Step #706). In short, the execution apparatus determination portion 203 determines that an apparatus to which the print job is to be given is the image forming apparatus 1 installed in the area 5 corresponding to the extracted temperature difference TD.

It is assumed that, for example, the temperature differences TD1-TD4 shown in FIGS. 7A-7D are obtained as the temperature differences TD for the areas 51-54, respectively. In the illustrated example, the temperature difference TD3 has the smallest value. In other words, referring to FIG. 7C, the ambient temperature TP3 is lower than the preset temperature TS3, and the difference TD3 therebetween has the largest value in the illustrated example. Thus, the execution apparatus determination portion 203 determines that the image forming apparatus 1 in the area 53, i.e., the image forming apparatus 13, is the image forming apparatus 1 suitable for executing the print job.

The job execution instructing portion 205 instructs the image forming apparatus 1 determined by the execution apparatus determination portion 203 to execute the print job, and sends the print data 6B and the conditions data 6C for the print job to the image forming apparatus 1 determined.

When receiving the print data 6B and the conditions data 6C, the image forming apparatus 1 executes the print job based on the print data 6B and the conditions data 6C. Thereby, an image is printed onto a sheet of paper.

According to the foregoing processing, if the temperature differences TD for the individual areas 5 are the temperature differences TD1-TD4 shown in FIGS. 7A-7D, then the image forming apparatus 13 executes the print job. The operation of the image forming apparatus 13 develops heat therefrom, so that an ambient temperature in the area 53 rises.

The area 53 has the temperature difference TD having the smallest value in all the areas 5. Even if the ambient temperature in the area 53 rises as shown in FIG. 8A due to the heat caused by the execution of the print job, the ambient temperature in the area 53 is most likely to be still lower than the preset temperature compared to the cases of the other areas.

On the other hand, if the image forming apparatus 1 in one of the areas 5 other than the area 53, e.g., in the area 54, executes a print job, then the ambient temperature TP in the area 54 rises as shown in FIG. 8B and the temperature difference from the preset temperature TS becomes larger. This causes the air conditioner for cooling installed in the area 54 to perform high-power operation for a longer period of time.

As for the case of air conditioner for heating, if the image forming apparatus 1 in the area 53 executes a print job, then the ambient temperature TP in the area 53 is increased to reach the preset temperature TS. Accordingly, the heat generated by printing is utilized to shorten a time period during which the air conditioner in the area 53 performs high-power operation.

In this way, the image forming apparatus 1 in the area 5 corresponding to the smallest temperature difference TD is caused to execute a print job. This enables reduction in power consumption by all the air conditioners in the areas 51-54 during a certain period of time.

Figure 9:
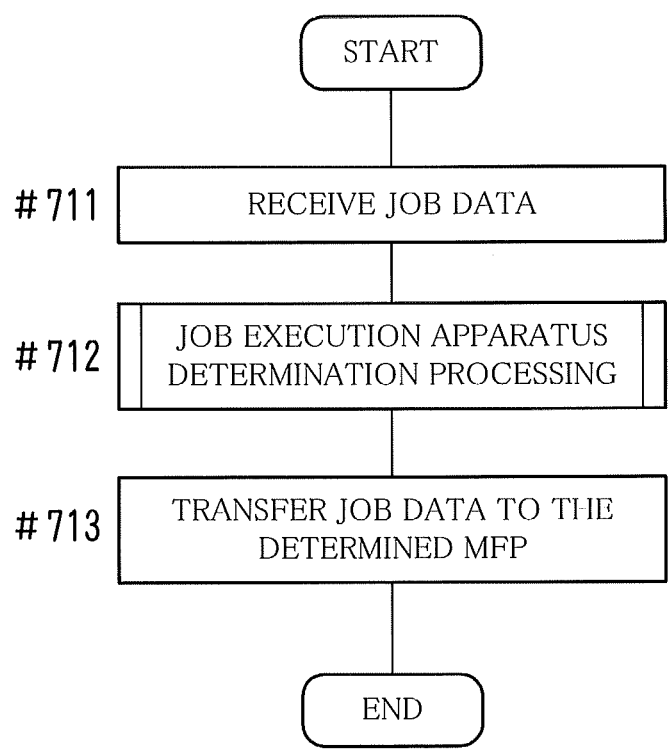
FIG. 9 is a flowchart depicting an example of the flow of the entire processing performed by a print server.

FIG. 9 is a flowchart depicting an example of the flow of the entire processing performed by the print server 2.

The following is a description of the flow of the entire processing performed by the print server 2 to allocate print jobs, with reference to the flowchart of FIG. 9.

When receiving print data 6B and conditions data 6C from the terminal 3 (Step #711), the print server 2 determines an image forming apparatus 1 suitable for executing a print job corresponding to the print data 6B and the conditions data 6C (Step #712). How to determine such an image forming apparatus 1 is the same as that described above with reference to FIG. 6.

The print server 2 then instructs the image forming apparatus 1 thus determined to execute the print job, and transfers the print data 6B and the conditions data 6C for the print job to the image forming apparatus 1 determined (Step #713).

In this embodiment, an air conditioning system such as an air conditioner is not controlled directly, an image forming apparatus 1 suitable for executing a print job is determined, and the print job is given to the image forming apparatus 1 determined. This saves energy used in offices and so on.

Modifications of this embodiment are given in order below.

[Method for Determining Image Forming Apparatus 1 in Combination with User's Selection]

According to the determination method in the foregoing embodiment, the image forming apparatus 1 to execute a print job is an image forming apparatus 1 installed in an area 5 corresponding to the smallest temperature difference TD. Instead of this, however, another arrangement is possible in which areas 5 corresponding to the temperature difference TD having a constant value (minus 2 degrees, for example) or less are selected from among all the areas 5, and a user is informed of the image forming apparatuses 1 installed in the selected areas 5. The user then selects any one of the image forming apparatuses 1 thus informed, and the image forming apparatus 1 selected may be caused to execute a print job.

[Time to Obtain Characteristic Data 6A and Ambient Temperature Data 6D]

In the forgoing embodiment, the print server 2 stores, in advance, characteristic data 6A in the characteristic data storage portion 201. Further, in the foregoing embodiment, ambient temperature data 6D is obtained every time when the need arises to cause any one of the image forming apparatuses 1 to execute a print job. Instead of this, however, the characteristic data 6A and the ambient temperature data 6D may be obtained at the following time.

The individual air conditioners in the areas 5 are structured to have a communication function. When a preset temperature TS of an air conditioner is changed, the air conditioner sends data indicating the post-change preset temperature TS and an identifier of the air conditioner to the print server 2. The identifier of the air conditioner is associated with an area identifier EC of the area 5 where the corresponding air conditioner is installed. Upon the receipt of the data, the print server 2 stores the same into the characteristic data storage portion 201 as characteristic data 6A for the corresponding area 5. Alternatively, it is possible for the print server 2 to inquire the current preset temperature TS from the air conditioner in each of the areas 5 at regular time intervals. If the current preset temperature TS is changed from the previous value, then the characteristic data 6A may be updated accordingly.

On the other hand, each of the image forming apparatuses 1 measures an ambient temperature TP of the corresponding installation area at regular time intervals, and informs the print server 2 of data indicating the ambient temperature TP measured and an area identifier EC of the area 5 that is the installation location of the corresponding image forming apparatus 1. Upon the receipt of the data, the print server 2 stores the data as ambient temperature data 6D of the corresponding area 5 into a predetermine database. Alternatively, it is possible for the print server 2 to inquire the current ambient temperature TP from the image forming apparatus 1 in each of the areas 5 at regular time intervals. If the current ambient temperature TP is changed from the previous value, then the ambient temperature data 6D may be updated accordingly.

Yet alternatively, an air conditioner rather than the image forming apparatus 1 may measure an ambient temperature TP in the corresponding area 5, and inform the print server 2 of the measurement result.

[Method for Determining Image Forming Apparatus 1 in Consideration of Rise in Ambient Temperature Caused by Execution of Print Job]

Figure 10:
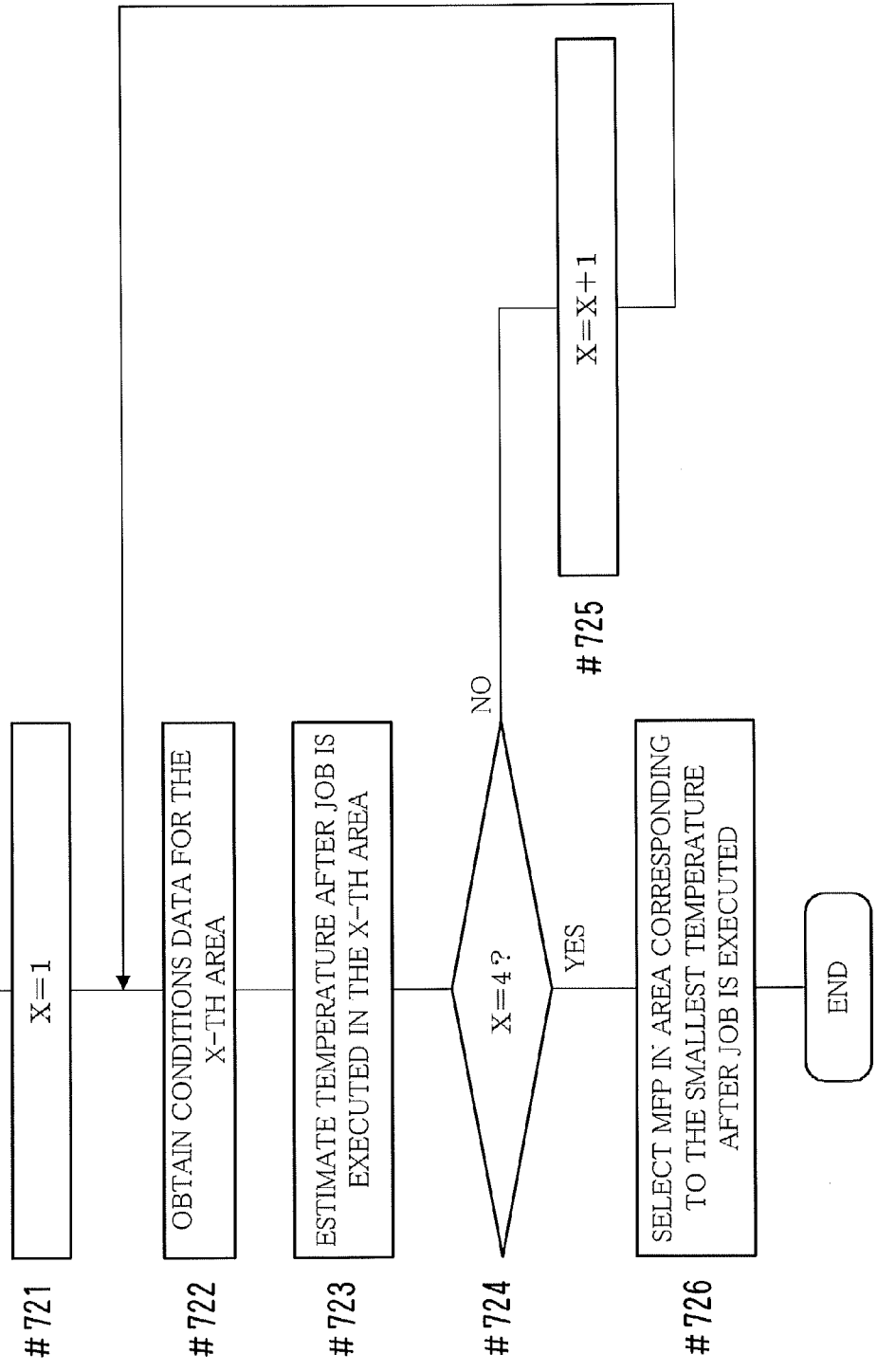
FIG. 10 is a flowchart depicting a modification of the flow of job execution apparatus determination processing.

FIG. 10 is a flowchart depicting a modification of the flow of job execution apparatus determination processing.

When an image forming apparatus 1 executes a print job, an ambient temperature therearound increases. How much the ambient temperature increases depends on the features and conditions of the image forming apparatus 1. In particular, as for the case of the air conditioner for cooling, a smaller rise in ambient temperature is more preferable in order to reduce the power consumption.

In view of this, the print server 2 determines an image forming apparatus 1 to execute a print job by using the following method instead of the method described earlier with reference to FIG. 6 and so on.

The characteristic data storage portion 201 stores, in advance, characteristic data 6E rather than the characteristic data 6A for each of the areas 5. The characteristic data 6E indicates, in addition to an area identifier EC of the corresponding area 5 and a preset temperature TS of an air conditioner in the corresponding area 5, a warm-up increased temperature TW and a printing increased temperature TJ of the image forming apparatus 1 in the corresponding area 5.

The warm-up increased temperature TW is a temperature that is increased by starting (warming up) the printer unit 10g in the area 5 corresponding to the area identifier EC. The warm-up increased temperature TW may be calculated in advance through the following method, for example. First, an ambient temperature TM1 under a state where the printer unit 10g does not operate is measured. The printer unit 10g is started promptly and an ambient temperature TM2 after the start-up is measured. The measurement may be made by the temperature sensor 10j or the air conditioner. The same applies to the descriptions hereinafter. Then, the ambient temperature TM1 is subtracted from the ambient temperature TM2. The resultant is regarded as the warm-up increased temperature TW.

The printing increased temperature TJ is a temperature that is increased by printing out an image onto a sheet of paper. The printing increased temperature TJ may be calculated in advance through the following method, for example. First, the printer unit 10g is started and an ambient temperature TN1 under a state where the printer unit 10g is idle is measured. Without delay, the printer unit 10g is caused to execute a print job of printing out images onto N sheets of paper, and an ambient temperature TN2 after the execution of the print job is measured. Then, the ambient temperature TN1 is subtracted from the ambient temperature TN2, and the resultant is divided by N. A value obtained by the subtraction and division is regarded as the printing increased temperature TJ.

The warm-up increased temperature TW and the printing increased temperature TJ are calculated in advance for each of the image forming apparatuses 1.

Another arrangement is possible in which, every time a print job is executed, records of the ambient temperatures TM1, TM2, TN1, and TN2, and the number of prints N are kept, and the warm-up increased temperature TW and the printing increased temperature TJ are recalculated based on the records. Yet another arrangement is possible in which, at certain time intervals, the warm-up increased temperature TW and the printing increased temperature TJ are recalculated by using the foregoing records associated with print jobs executed during the certain time period.

When the job data receiving portion 202 receives print data 6B and conditions data 6C, the execution apparatus determination portion 203 and the ambient temperature data obtaining portion 204 determine an image forming apparatus 1 suitable for executing a print job based on the print data 6B and the conditions data 6C in a manner as shown in FIG. 10.

The execution apparatus determination portion 203 instructs the ambient temperature data obtaining portion 204 to obtain data on area conditions. In response to the instructions, the ambient temperature data obtaining portion 204 requests data on current conditions of the area 51 from the image forming apparatus 11 installed in the area 51 that is the first area 5, and obtains the data from the image forming apparatus 11 (Step #722).

At this time, in the image forming apparatus 11, the ambient temperature replying application is implemented to carry out the processing described below. Conditions data 6F is created instead of the ambient temperature data 6D, and the conditions data 6F is then sent to the print server 2.

The temperature sensor 10j measures the current ambient temperature TP. The CPU 10a creates the conditions data 6F. As with the ambient temperature data 6D, the conditions data 6F indicates the ambient temperature TP obtained by the measurement and the area identifier EC of the area 51. The conditions data 6F further contains a start flag FG. The start flag FG shows whether or not the printer unit 10g is running. The start flag FG indicates "1" if the printer unit 10g is not running. The start flag FG indicates "0" if the printer unit 10g is running.

Then, the conditions data 6F is sent to the print server 2 via the network interface 10h.

The execution apparatus determination portion 203 uses the equation (1) below to estimate, based on the conditions data 6F sent from the image forming apparatus 11 and the characteristic data 6E for the image forming apparatus 11 stored in the characteristic data storage portion 201, an ambient temperature in the area 51 after execution of the print job (such a temperature is hereinafter referred to as a "post-execution temperature TF") (Step #723).

$$TF = TP + TW \cdot FG + TJ \cdot CP \quad (1)$$

where "TP" and "FG" represent the ambient temperature TP and the start flag FG respectively indicated in the conditions data 6F sent from the image forming apparatus 11, "TW" and "TJ" represent the warm-up increased temperature TW and the printing increased temperature TJ respectively indicated in the characteristic data 6A for the image forming apparatus 11, and "CP" represents the total number of sheets to be outputted by executing the print job this time. The value of "CP" can be determined based on the print data 6B and the conditions data 6C. It is assumed that, for example, three pages of images are indicated in the print data 6B, and the set of prints indicated in the conditions data 6C is five sets. In such a case, the value of "CP" is fifteen by the following equation:

$$CP = 3 \times 5 = 15.$$

Likewise, as for the second through fourth areas 5, the execution apparatus determination portion 203 and the ambient temperature data obtaining portion 204 receive conditions data 6F from each of the image forming apparatuses 12-14, and uses the equation (1) provided above to calculate a post-execution temperature TF based on the characteristic data 6A and the conditions data 6F for each of the image forming apparatuses 12-14 (Steps #722-#725).

The execution apparatus determination portion 203 then extracts, from the post-execution temperatures TF for the areas 51-54, one having the smallest value, and determines that the image forming apparatus 1 installed in one of the areas 5 corresponding to the extracted post-execution temperature TF is an image forming apparatus 1 suitable for executing the print job (Step #726).

[Allocating Print Jobs Based on Humidity]

In the foregoing embodiment and the modifications thereof, a plurality of image forming apparatuses 1 are sometimes deemed as candidates for a target device to which one print job is to be allocated.

In such a case, one of the image forming apparatuses 1 may be selected as a target device to which the print job is to be given in the following manner.

A humidity sensor is provided in advance in each of the image forming apparatuses 1. If a plurality of image forming apparatuses 1 are regarded as candidates for a target device to which one print job is to be given, then the execution apparatus determination portion 203 inquires of each of the image forming apparatuses 1 as to humidity. In response to the inquiry, the individual image forming apparatuses 1 measure humidity and inform the execution apparatus determination portion 203 of the measurement results. The execution apparatus determination portion 203 then selects the image forming apparatus 1 which measured the lowest humidity as the target device to which the print job is to be given.

The following arrangement is also possible: Humidity sensors of the individual image forming apparatuses 1 are controlled to measure humidity at regular intervals, and to inform the print server 2 of the measurement results. The print server 2 keeps records of the humidity in the database, and a target device to which a print job is to be given is determined based on the records.

The higher the humidity is, the more likely paper curls and a paper jam occurs. Further, the higher the humidity is, the fainter or lighter the print is due to condensation. In this way, a target device to which a print job is to be given is determined in consideration of humidity, which results in obtaining a printed image having a high quality.

[Method for Determining Image Forming Apparatus 1 Based on Difference from Common Reference Temperature]

In the foregoing embodiment and the modifications thereof, a preset temperature TS is set for each of the areas 5. Instead of this, however, a reference temperature TH common to all the areas 5 may be set, and an image forming apparatus 1 as a target device to which a print job is to be given may be determined in the following manner.

The execution apparatus determination portion 203 selects image forming apparatuses 1 in areas 5 where the ambient temperature TP is lower than the reference temperature TH. The image forming apparatuses 1 thus selected are presented to a user. The user selects one of the image forming apparatuses 1 presented. In accordance with the selection, a print job is given to the image forming apparatus 1 selected by the user.

Another configuration is possible in which the execution apparatus determination portion 203 gives a print job to an image forming apparatus 1 in an area 5 where the ambient temperature TP is the lowest in all the areas 5.

[Case where a Plurality of Print Jobs are Received Successively Around the Same Time]

FIG. 11 is a flowchart depicting a modification of the flow of job execution apparatus determination processing.

The print server 2 sometimes receives, from one or more terminals 3, a plurality of print jobs one after another around the same time. In such a case, every time one print job is received, the print job may be allocated to an image forming apparatus 1 in the manner as discussed in the foregoing embodiment and modifications thereof. However, the following job allocation is also possible.

When the job data receiving portion 202 receives a print job, more specifically, when the job data receiving portion 202 receives print data 6B and conditions data 6C, the execution apparatus determination portion 203 waits for another print job to be sent for a preset time period, e.g., one minute, without determining an image forming apparatus 1 to which the already-received print job is to be given.

If a plurality of (P) jobs are received before the lapse of the preset time period, then the execution apparatus determination portion 203 determines to which image forming apparatuses the print jobs received during the preset time period are allocated in the manner as shown in FIG. 11.

The execution apparatus determination portion 203 instructs the ambient temperature data obtaining portion 204 to obtain ambient temperature data 6D for each of the areas 5. In response to the instructions, the ambient temperature data obtaining portion 204 requests ambient temperature data 6D from each of the image forming apparatuses 1 in the areas 5, and obtains the ambient temperature data 6D therefrom (Step #731).

The execution apparatus determination portion 203 determines, for each of the areas 5, a predicted temperature TQ that is an ambient temperature expected for the case where the print job is finished (Step #732). The initial value of the predicted temperature TQ is an ambient temperature TP indicated in ambient temperature data 6D received from an image forming apparatus 1 in an area 5 corresponding to the predicted temperature TQ.

The execution apparatus determination portion 203 assigns, among yet-to-be-assigned print jobs, a print job by which the highest amount of heat is produced to an image forming apparatus 1 in an area 5 corresponding to the lowest predicted temperature TQ (Step #734). Note that the print job by which the highest amount of heat is produced is a print job by which the largest number of prints are produced.

The execution apparatus determination portion 203 then calculates a temperature-to-rise, i.e., how many degrees of temperature is to rise for a case where the image forming apparatus 1 executes the print job, and adds the temperature-to-rise to the predicted temperature TQ for the area 5 where the image forming apparatus 1 is installed (Step #735). As discussed above, the temperature-to-rise can be calculated based on the warm-up increased temperature TW, the printing increased temperature TJ, and the number of prints indicated in the characteristic data 6E for the image forming apparatus 1.

Likewise, as for the remaining print jobs, the execution apparatus determination portion 203 performs the processing of Step #734 and Step #735, and assigns a print job by which the highest amount of heat is produced to the image forming apparatus 1 in an area 5 corresponding to the lowest predicted temperature TQ.

In this modification, print jobs are assigned in order of decreasing heat produced by executing a print job. However, print jobs are assigned in different order. For example, print jobs may be assigned in order of increasing heat produced by executing a print job, or, alternatively, in order in which the print jobs were received by the print server 2.

[Case where a Plurality of Image Forming Apparatuses 1 are Installed in One Area 5]

In the foregoing embodiment and the modifications thereof, the case is described in which one image forming apparatus 1 is installed in one area 5. If a plurality of image forming apparatuses 1 are installed in one area 5, the print server 2 may assign a print job to one of the image forming apparatuses 1 in the following manner.

One image forming apparatus 1 is selected in advance for each of the areas 5 as a representative image forming apparatus 1. The print server 2 sends and receives the foregoing sets of data with the representative image forming apparatuses 1, and determines an area 5 that is suitable for a print job to be executed. The print server 2 then gives the print job to any one of the image forming apparatuses 1 installed in the determined area 5. To be specific, the print server 2 sends print data 6B and conditions data 6C for the print job to any one of the image forming apparatuses 1. For example, the print server 2 gives the print job to one of the image forming apparatuses 1 selected by the user. Alternatively, the print server 2 gives the print job to an image forming apparatus 1 which produces the least heat by executing the print job. In such a case, heat developed by warm-up is also taken in consideration.

[Other]

In the foregoing embodiment and the modifications thereof, the case is described in which an air conditioner, i.e., an air-conditioning system having both cooling and heating functions is located in each of the areas 5. The present invention is also applicable to a case in which an air-conditioning system having only one of the functions is located.

In the foregoing embodiment and the modifications thereof, the case is described in which an image forming apparatus 1 having many functions is installed in each of the areas 5. The present invention is also applicable to a case in which an apparatus having only a copy function, or an apparatus having only a PC printing function is located.

In the foregoing embodiment and the modifications thereof, the print server 2 determines an image forming apparatus 1 to execute a print job. Instead of this, however, the terminal 3 may make such a determination.

In the foregoing embodiment and the modifications thereof, how much heat is to be produced due to execution of a print job is estimated based on the number of sheets of output paper. Alternatively, the estimate may be made in consideration of the following conditions: whether the print job involves color printing or not; the size of paper; and whether the print job involves double-sided printing.

It is to be understood that the configurations of the printing system 100, the image forming apparatus 1, and the print server 2, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An apparatus for assigning a print job, the apparatus comprising:
   a detector configured to detect an ambient temperature of each of a plurality of areas, said each of the areas including at least one printer and at least one air conditioning system;
   a selection portion configured to select a printer included in a suitable area of the areas, the suitable area being an area where the ambient temperature detected is lower than a predetermined temperature; and
   an issuing portion configured to give the print job to the printer selected.

2. The apparatus according to claim 1, wherein
   the selection portion is configured to select a printer included in an area of the areas, with a lowest ambient temperature.

3. The apparatus according to claim 1, wherein the predetermined temperature is a preset temperature set in the air conditioning system included in each of the areas, and the predetermined temperature is separately set for each of the areas.

4. The apparatus according to claim 1, wherein the predetermined temperature is set to be common to the areas.

5. The apparatus according to claim 1, wherein the detector detects the ambient temperature of each of the areas by receiving data indicating the ambient temperature from the printer or the air conditioning system included in said each of the areas.

6. The apparatus according to claim 1, wherein, if the printer selected is at least two printers, then the issuing portion gives the print job to a printer included in an area, of the areas, where humidity is a lowest.

7. The apparatus according to claim 1, wherein
   the detector is configured to detect the ambient temperature of each of the areas by receiving, from each of a plurality of printers predetermined for each of the areas, data indicating the ambient temperature of each of the areas where said each of the printers is included.

8. An apparatus for assigning a print job, the apparatus comprising:
   a detector configured to detect an ambient temperature of each of a plurality of areas, said each of the areas including at least one printer and at least one air conditioning system;
   an estimating portion configured to estimate the ambient temperature of each of the areas for a case where a printer included in said each of the areas finishes executing a print job, the ambient temperature being estimated based on the ambient temperature detected and characteristics of the printer;
   a selection portion configured to select a printer included in a suitable area of the areas, the suitable area being an area where the ambient temperature estimated is lower than a predetermined temperature; and
   an issuing portion configured to give the print job to the printer selected.

9. The apparatus according to claim 8, wherein
   the selection portion is configured to select a printer included in an area, of the areas, with a lowest ambient temperature.

10. The apparatus according to claim 8, wherein
    the detector is configured to detect the ambient temperature of each of the areas by receiving, from each of a plurality of printers predetermined for each of the areas, data indicating the ambient temperature of each of the areas where said each of the printers is included.

11. An apparatus for assigning, in order, P print jobs wherein P represents 2 or more, the apparatus comprising:
    a detector configured to detect an ambient temperature of each of a plurality of areas, said each of the areas including at least one printer and at least one air conditioning system;
    an estimating portion configured to estimate, when a Q-th print job out of the P print jobs is assigned, wherein Q represents a number in a range from 2 to P inclusive, the ambient temperature of each of the areas for a case where a printer included in said each of the areas finishes executing a print job earlier than a (Q−1)-th print job assigned to the printer and the printer finishes executing the Q-th print job, the ambient temperature being estimated based on the ambient temperature detected and characteristics of the printer;
    a selection portion configured to select, as a target printer to which the Q-th print job is assigned, a printer included in an area, of the areas, where the ambient temperature estimated is a lowest; and
    an issuing portion configured to give the Q-th print job to the printer selected.

12. The apparatus according to claim 11, wherein the issuing portion gives the P print jobs in order of decreasing heat from a print job by which a highest amount of heat is generated.

13. The apparatus according to claim 11, wherein
the detector is configured to detect the ambient temperature of each of the areas by receiving, from each of a plurality of printers predetermined for each of the areas, data indicating the ambient temperature of each of the areas where said each of the printers is included.

14. A method for assigning a print job, the method comprising:
detecting an ambient temperature of each of a plurality of areas, said each of the areas including at least one printer and at least one air conditioning system;
selecting a printer included in a suitable area of the areas, the suitable area being an area where the ambient temperature detected is lower than a predetermined temperature; and
giving the print job to the printer selected.

15. The method according to claim 14, wherein
the suitable area of the areas is the area with a lowest ambient temperature.

16. The method according to claim 14, wherein
detecting the ambient temperature of each of the areas by receiving, from each of a plurality of printers predetermined for each of the areas, data indicating the ambient temperature of each of the areas where said each of the printers is included.

17. A method for assigning a print job, the method comprising:
detecting an ambient temperature of each of a plurality of areas, said each of the areas including at least one printer and at least one air conditioning system;
estimating the ambient temperature of each of the areas for a case where a printer included in said each of the areas finishes executing a print job, the ambient temperature being estimated based on the ambient temperature detected and characteristics of the printer;
selecting a printer included in a suitable area of the areas, the suitable area being an area where the ambient temperature estimated is lower than a predetermined temperature; and
giving the print job to the printer selected.

18. The method according to claim 17, wherein
the suitable area of the areas is the area with a lowest ambient temperature.

19. The method according to claim 17, wherein
detecting the ambient temperature of each of the areas by receiving, from each of a plurality of printers predetermined for each of the areas, data indicating the ambient temperature of each of the areas where said each of the printers is included.

20. A method for assigning, in order, P print jobs wherein P represents 2 or more, the method comprising:
detecting an ambient temperature of each of a plurality of areas, said each of the areas including at least one printer and at least one air conditioning system;
when a Q-th print job out of the P print jobs is assigned, wherein Q represents a number in a range from 2 to P inclusive, estimating the ambient temperature of each of the areas for a case where a printer included in said each of the areas finishes executing a print job earlier than a (Q−1)-th print job assigned to the printer and the printer finishes executing the Q-th print job, the ambient temperature being estimated based on the ambient temperature detected and characteristics of the printer;
selecting, as a target printer to which the Q-th print job is assigned, a printer included in an area, of the areas, where the ambient temperature estimated is a lowest; and
giving the Q-th print job to the printer selected.

21. The method according to claim 20, wherein
detecting the ambient temperature of each of the areas by receiving, from each of a plurality of printers predetermined for each of the areas, data indicating the ambient temperature of each of the areas where said each of the printers is included.

22. A non-transitory computer-readable recording medium that records a program for assigning a print job causing a computer built into an image forming apparatus to execute:
detecting an ambient temperature of each of a plurality of areas, said each of the areas including at least one printer and at least one air conditioning system;
selecting a printer included in a suitable area of the areas, the suitable area being an area where the ambient temperature detected is lower than a predetermined temperature; and
giving the print job to the printer selected.

23. The non-transitory computer-readable recording medium according to claim 22, wherein the suitable area of the areas is the area with a lowest ambient temperature.

24. The non-transitory computer-readable recording medium according to claim 22, wherein
the program causes the computer built into the image forming apparatus to execute:
detecting the ambient temperature of each of the areas by receiving, from each of a plurality of printers predetermined for each of the areas, data indicating the ambient temperature of each of the areas where said each of the printers is included.

25. A non-transitory computer-readable recording medium that records a program for assigning a print job causing a computer built into an image forming apparatus to execute:
detecting an ambient temperature of each of a plurality of areas, said each of the areas including at least one printer and at least one air conditioning system;
estimating the ambient temperature of each of the areas for a case where a printer included in said each of the areas finishes executing a print job, the ambient temperature being estimated based on the ambient temperature detected and characteristics of the printer;
selecting a printer included in a suitable area of the areas, the suitable area being an area where the ambient temperature estimated is lower than a predetermined temperature; and
giving the print job to the printer selected.

26. The non-transitory computer-readable recording medium according to claim 25, wherein the suitable area of the areas is the area with a lowest ambient temperature.

27. The non-transitory computer-readable recording medium according to claim 25, wherein
the program causes the computer built into the image forming apparatus to execute:
detecting the ambient temperature of each of the areas by receiving, from each of a plurality of printers predetermined for each of the areas, data indicating the ambient temperature of each of the areas where said each of the printers is included.

28. A non-transitory computer-readable recording medium that records a program for causing a computer built into an image forming apparatus to assign, in order, P print jobs, wherein P represents 2 or more, the program causing the computer to execute:
detecting an ambient temperature of each of a plurality of areas, said each of the areas including at least one printer and at least one air conditioning system;

when a Q-th print job out of the P print jobs is assigned, wherein Q represents a number in a range from 2 to P inclusive, estimating the ambient temperature of each of the areas for a case where a printer included in said each of the areas finishes executing a print job earlier than a (Q−1)-th print job assigned to the printer and the printer finishes executing the Q-th print job, the ambient temperature being estimated based on the ambient temperature detected and characteristics of the printer;

selecting, as a target printer to which the Q-th print job is assigned, a printer included in an area, of the areas, where the ambient temperature estimated is a lowest; and giving the Q-th print job to the printer selected.

29. The non-transitory computer-readable recording medium according to claim 28, wherein the program causes the computer built into the image forming apparatus to execute:

detecting the ambient temperature of each of the areas by receiving, from each of a plurality of printers predetermined for each of the areas, data indicating the ambient temperature of each of the areas where said each of the printers is included.

\* \* \* \* \*